US012620213B2

(12) United States Patent
Hsu et al.

(10) Patent No.: US 12,620,213 B2
(45) Date of Patent: May 5, 2026

(54) COMPUTER VISION VEHICLE LOCATING FUSION SYSTEM AND METHOD THEREOF

(71) Applicant: AUTOMOTIVE RESEARCH & TESTING CENTER, Changhua Hsien (TW)

(72) Inventors: Chih-Yuan Hsu, Changhua Hsien (TW); Te-Hsiang Wang, Changhua Hsien (TW); You-Sian Lin, Changhua Hsien (TW)

(73) Assignee: AUTOMOTIVE RESEARCH & TESTING CENTER, Changhua Hsien (TW)

( * ) Notice: Subject to any disclaimer, the term of this patent is extended or adjusted under 35 U.S.C. 154(b) by 626 days.

(21) Appl. No.: 18/085,146

(22) Filed: Dec. 20, 2022

(65) Prior Publication Data

US 2024/0203109 A1      Jun. 20, 2024

(51) Int. Cl.
*G06V 10/80* (2022.01)
*G01S 19/47* (2010.01)
*G06V 20/56* (2022.01)

(52) U.S. Cl.
CPC ............ *G06V 10/806* (2022.01); *G01S 19/47* (2013.01); *G06V 20/56* (2022.01)

(58) Field of Classification Search
CPC ....... G06V 10/806; G06V 20/56; G01S 19/47
See application file for complete search history.

(56) References Cited

U.S. PATENT DOCUMENTS

| | | | | |
|---|---|---|---|---|
| 7,610,146 B2 * | 10/2009 | Breed | ..................... | G01C 21/28 |
| | | | | 701/300 |
| 8,050,863 B2 * | 11/2011 | Trepagnier | ............ | B60W 30/00 |
| | | | | 340/436 |
| 9,400,941 B2 * | 7/2016 | Kurz | ......................... | G06T 7/74 |
| 12,287,210 B2 * | 4/2025 | Lee | ...................... | G06V 20/588 |
| 2011/0064312 A1 * | 3/2011 | Janky | ......................... | G06T 7/74 |
| | | | | 382/195 |
| 2012/0176491 A1 * | 7/2012 | Garin | ....................... | G01S 19/49 |
| | | | | 348/113 |
| 2021/0019910 A1 * | 1/2021 | Huyn | ......................... | G06T 7/75 |
| 2022/0398775 A1 * | 12/2022 | Streem | .................... | G06T 17/05 |
| 2023/0394756 A1 * | 12/2023 | Chen | ........................ | G06T 19/20 |

* cited by examiner

*Primary Examiner* — Erin M Piateski
*Assistant Examiner* — Gabriel Joseph Rene Lambert
(74) *Attorney, Agent, or Firm* — RABIN & BERDO, P.C.

(57) ABSTRACT

A computer vision vehicle locating fusion method includes: receiving an instant driving image from a camera, extracting multiple image features from the instant driving image and the multiple image features being extracted with the pre-stored feature sets in the storage device to fuse an inertial measurement parameter and the pre-stored satellite locating coordinate corresponding to one of the pre-stored feature sets that best matches the instant driving image to generate a first candidate coordinate; using the one satellite measurement coordinate received from a satellite locating device as a second candidate coordinate; calculating a first difference between the first candidate coordinate and an estimated reference coordinate, and calculating a second difference between the second candidate coordinate and the estimated reference coordinate; and determining and outputting the first candidate coordinate or the second candidate coordinate that has the smaller difference with the estimated reference coordinate.

16 Claims, 11 Drawing Sheets

COMPUTER VISION VEHICLE LOCATING FUSION SYSTEM AND METHOD THEREOF

BACKGROUND OF THE INVENTION

1. Field of the Invention

The present invention relates to a vehicle locating system and method thereof, in particular to a computer vision vehicle locating fusion system and method thereof.

2. Description of the Prior Arts

Self-driving vehicle is one of the main tools of future transportation, and the locating technology of the self-driving vehicle is also a popular R&D target. The conventional locating technologies may use GPS (Global Locating System) locating device, Inertial Measurement Unit (IMU) or Light Detection and Ranging (LiDAR), etc.

However, various conventional locating technologies have their own shortcomings, which may lead to questionable locating reliability. Therefore, feasible solutions are yet to be found. For example, the signal stability of the GPS locating device is often disturbed by the driving environment, such as, urban areas with many buildings and tunnels that can block GPS signals, or GPS locating devices cannot receive GPS signals properly in bad weather. The IMU locating technology has a problem of accumulated errors. Also the optical radar is easily affected by heavy rain, snow and fog, and is very costly.

SUMMARY OF THE INVENTION

In view of the above-mentioned problems, the present invention provides a computer vision vehicle locating fusion system and method thereof to overcome the problem of the questionable reliability of various conventional positioning technologies that are susceptible to changes in the surrounding environment.

A computer vision vehicle locating fusion system comprises:

a storage device storing multiple pre-stored feature sets and multiple pre-stored satellite locating coordinates respectively corresponding to the multiple pre-stored feature sets, wherein each of the pre-stored feature sets comprises multiple image features, and the multiple image features of each one of the multiple pre-stored feature sets are non-identical to the multiple image features of the other pre-stored feature sets;

a camera configured to be provided in a vehicle to output an instant driving image;

a satellite locating device configured to be provided in the vehicle to receive a satellite measurement coordinate of the vehicle;

an inertial measurement device configured to be provided in the vehicle to output an inertial measurement parameter of the vehicle; and a processing device configured to be provided in the vehicle and connect the storage device, the camera, the inertial measurement device and the satellite locating device; wherein, the processing device extracts multiple image features from the instant driving image, compares the multiple image features extracted with the pre-stored feature sets in the storage device to fuse the inertial measurement parameter and the pre-stored satellite locating coordinate corresponding to one of the pre-stored feature sets that best matches the instant driving image to generate a first candidate coordinate; the processing device uses the satellite measurement coordinate as a second candidate coordinate; and the processing device calculates a first difference between the first candidate coordinate and an estimated reference coordinate and a second difference between the second candidate coordinate and the estimated reference coordinate to determine and output the first candidate coordinate or the second candidate coordinate that has a smaller difference with the estimated reference coordinate.

A computer vision vehicle locating fusion method, performed by a processing device, comprises:

receiving an instant driving image from a camera, extracting multiple image features in the instant driving image and multiple image features being extracted with the pre-stored feature sets in a storage device to fuse an inertial measurement parameter and a pre-stored satellite locating coordinate corresponding to one of the pre-stored feature sets that best matches the instant driving image to generate a first candidate coordinate;

using one satellite measurement coordinate received from a satellite locating device as a second candidate coordinate;

calculating a first difference between the first candidate coordinate and an estimated reference coordinate, and calculating a second difference between the second candidate coordinate and the estimated reference coordinate; and determining and outputting the first candidate coordinate or the second candidate coordinate that has the smaller difference with the estimated reference coordinate.

In summary, the present invention integrates multiple sensors (including the camera, the satellite locating device and the inertial measurement device). Through the cooperative operation of the sensors, the storage device and the processing device, the present invention senses the surrounding environment of the vehicle by the camera to achieve preliminary positioning, and then cooperates with the satellite locating device and the inertial measurement device for locating fusion, thereby realizing the computer vision locating fusion architecture, so as to generate the first candidate coordinate and the second candidate coordinate. Either of the first candidate coordinate and the second candidate coordinate that has the smaller difference with the estimated reference coordinate is the better locating coordinate, so that while the vehicle is in the process of moving, the better locating coordinate is selected from the first candidate coordinate and the second candidate coordinate.

Compared with the conventional technologies, the present invention performs the locating not only through a single locating technology. The present invention generates multiple candidate coordinates through the aforementioned computer vision locating fusion architecture, and selects the better locating coordinate from the multiple candidate coordinates, instead of only relying on the first candidate coordinate or the second candidate coordinate, thereby relatively reducing the influence of changes in the surrounding environment on the locating technology of the present invention, and effectively improving the locating reliability of the present invention.

DETAILED DESCRIPTION OF THE PREFERRED EMBODIMENTS

Figure 1:
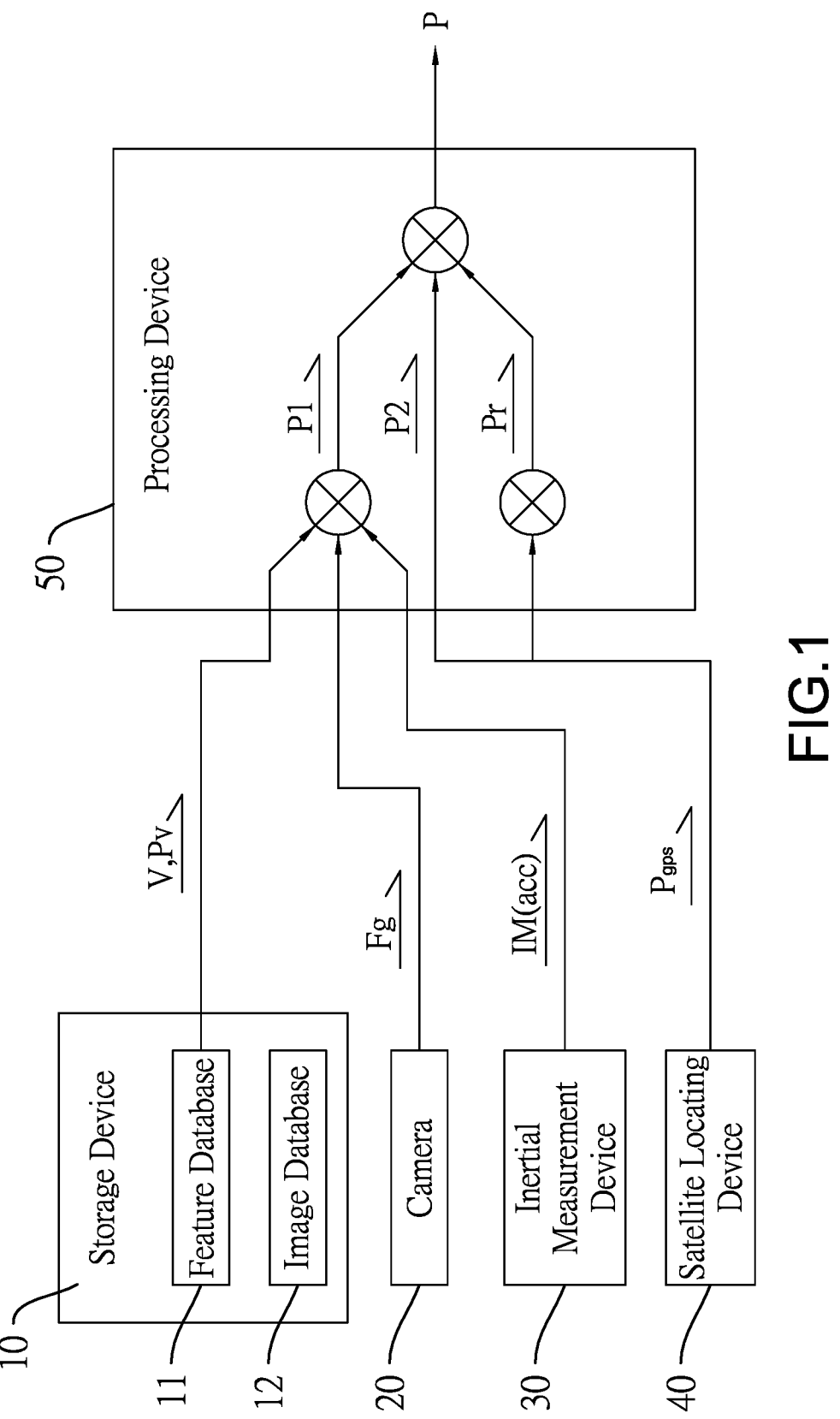
FIG. 1 is a schematic diagram of a square of the computer vision-based vehicle locating fusion system of the present invention.

Referring to FIG. 1, a computer vision vehicle locating fusion system of the present invention comprises a storage device 10, a camera 20, an Inertial Measurement Unit (IMU) device (hereinafter IMU 30), a satellite locating device 40 and a processing device 50. For example, the storage device 10 may be a conventional hard disk drive (HDD), a solid-state drive (SSD), a memory, a memory card, or the storage device 10 may be a cloud storage device that is not installed in the vehicle.

The storage device 10 stores multiple pre-stored feature sets V and multiple pre-stored satellite locating coordinates Pv respectively corresponding to the multiple pre-stored feature sets. The multiple pre-stored feature sets V may be stored in a feature database 11 of the storage device 10, and each of the pre-stored feature sets V comprises multiple image features (i.e., feature vectors). The multiple image features of each one of the multiple pre-stored feature sets are non-identical to the multiple image features of the other pre-stored feature sets. In addition, the feature database 11 may store serial numbers respectively corresponding to the multiple pre-stored feature sets V.

For example, when constructing the system of the present invention, the staff can drive a vehicle on the road and take photos along the way by a camera with satellite locating function. The shooting direction of the camera is the direction of vehicle running to shoot the scene in front of the vehicle. In this way, each image taken by the camera has the corresponding coordinate. The staff can get multiple images taken by the camera and multiple coordinates of the images through a computer and store the multiple images and coordinates in the storage device 10 to be the multiple pre-stored images and the multiple pre-stored satellite locating coordinates Pv. Wherein the multiple pre-stored images can be stored in an image database 12 of the storage device 10, the serial numbers can be, for example, the file names of each frame of the pre-stored images, representing the shooting time sequences.

Figure 2A:
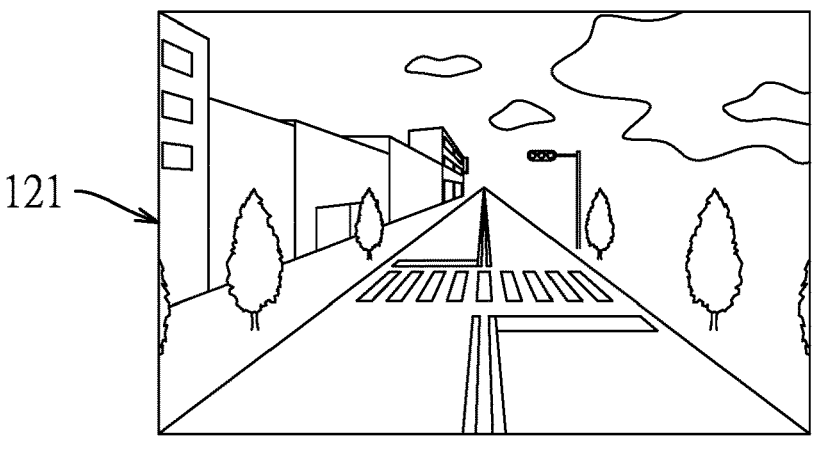
FIGS. 2A to 2E are pre-stored driving images stored by the storage device in the present invention.
Figure 2B:
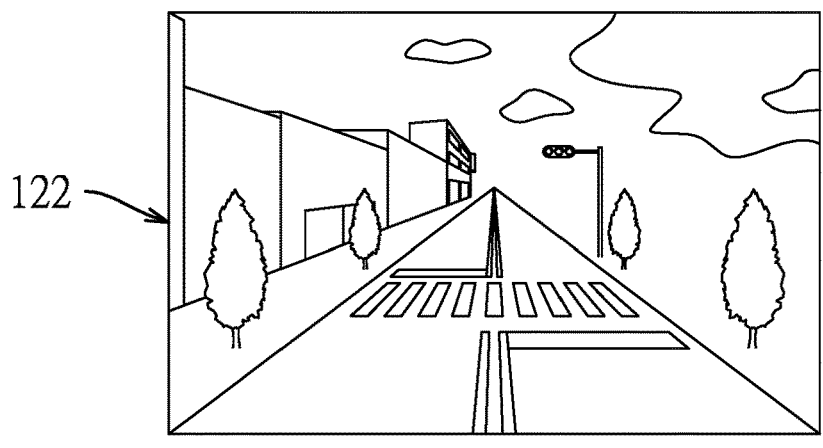
Figure 2C:
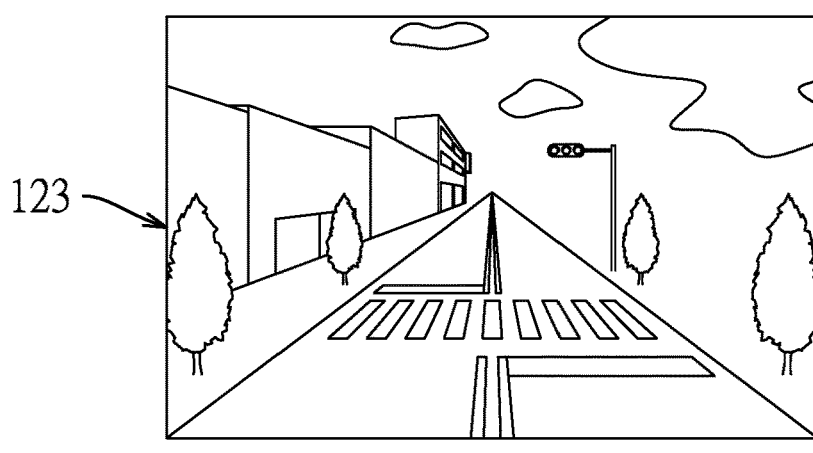
Figure 2D:
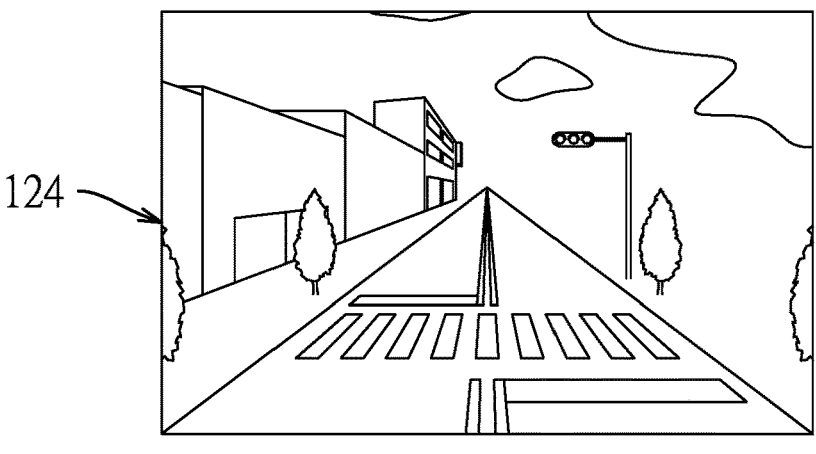
Figure 2E:
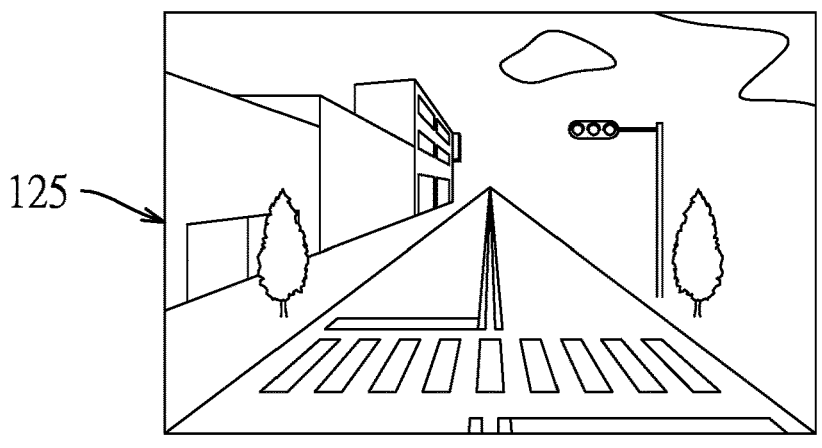

FIGS. 2A to 2E respectively show five consecutive frames of the pre-stored driving images 121 to 125 stored in the storage device 10, wherein the pre-stored driving image 121 shown in FIG. 2A is taken at the earliest time sequence, the pre-stored driving image 125 shown in FIG. 2E is taken at the latest time sequence, and FIGS. 2A to 2E can show that the vehicle is moving forward.

Each pre-stored feature set is created by applying an image pre-processing means and a feature extraction means to each of the pre-stored travel images in the image database 12 by a computer to obtain multiple feature vectors of each pre-stored driving image. The multiple feature vectors can be the multiple image features. It is noted that the image pre-processing means and the feature extraction means are common knowledge in the art. In short, the image pre-processing means comprises the steps of (1) graying the pre-stored driving image; (2) filtering high frequency noise in the grayed pre-stored driving image by a Gaussian filter; and (3) performing edge detection to generate scenic edge information corresponding to the pre-stored driving image, for example, by using Canny Edge Detection. The feature extraction means is, for example, to extract multiple feature vectors of the scene edge information by CNN as the multiple image features. The CNN may contain, for example, 12 convolutional layers and 3 pooling layers inserted therein. The Activation Function may be the ReLU function, but the parameters of the CNN are not limited to this.

Figure 3:
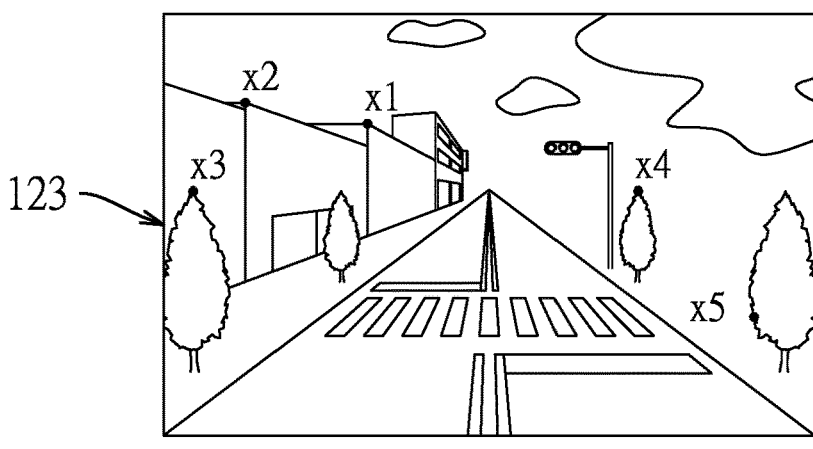
FIG. 3 is a schematic diagram of extracting multiple image features from the pre-stored travel image of FIG. 2C.

For example, the pre-stored driving image 123 shown in FIG. 2C can be automatically extracted with multiple image features x1~x5 shown in FIG. 3 after performing the image pre-processing means and the feature extraction means. Then the pre-stored feature set V of the pre-stored travel image 123 shown in FIG. 2C contains the multiple image features x1~x5 shown in FIG. 3, and the pre-stored feature set V is stored in the feature database 11 and corresponds to a specific serial number with a specific pre-stored satellite locating coordinate Pv. It should be noted that FIG. 3 only shows five image features x1~x5 for illustration. In image processing practice, the image pre-processing means and the feature extraction means are capable of extracting more image features.

The camera 20 may be fixed to the vehicle by a bracket. The shooting direction of the camera 20 is the direction of vehicle moving to capture a view in front of the vehicle and correspondingly outputs an instant driving image Fg.

The satellite locating device 40 receives a satellite measurement coordinate P of the vehicle. The satellite measurement coordinate P may be a GPS coordinate and includes, for example, at least a longitude value and a latitude value. Since the satellite locating device 40 is provided in the vehicle, the satellite measurement coordinate P may correspond to the location of the vehicle.

The inertial measurement device 30 outputs an inertial measurement parameter IM of the vehicle, wherein the inertial measurement parameter IM includes, for example, at least an angular velocity information and an acceleration information. Since the inertial measurement device 30 is provided in the vehicle, the inertial measurement parameters IM can correspond to the inertial information of the vehicle.

The processing device 50 may include a processor with data computing functions. The processing device 50 is connected to the storage device 10, the camera 20, the inertial measurement device 30 and the satellite locating device 40. The processing device 50 may store the instant driving images Fg received from the camera 20 in succession in the storage device 10. Each instant driving image Fg has a corresponding serial number (e.g. a file name) that represents shooting time sequence of the instant driving image Fg. Wherein, the storage device 10 may be a cloud storage device, and the processing device 50 may include a mobile communication module connected to the storage device 10 via mobile communication technology (e.g., 5G mobile communication technology).

The means for implementing the location of the present invention is illustrated as follows. Referring to FIG. 1, the processing device 50 defines a first candidate coordinate P1 and a second candidate coordinate P2, and then compares the first candidate coordinate P1 and the second candidate coordinate P2 with an estimated reference coordinate Pr to select the first candidate coordinate P1 or the second candidate coordinate P2 as an elected coordinate P. The elected coordinate P represents a better locating coordinate of the vehicle.

The processing device 50 can then perform automatic driving, automatic navigation or output to an external receiver according to the elected coordinates P. The external receiver may be, for example, a background information station, a road side unit (RSU), or other autonomous vehicles.

1. First Candidate Coordinate P1

Figure 4:
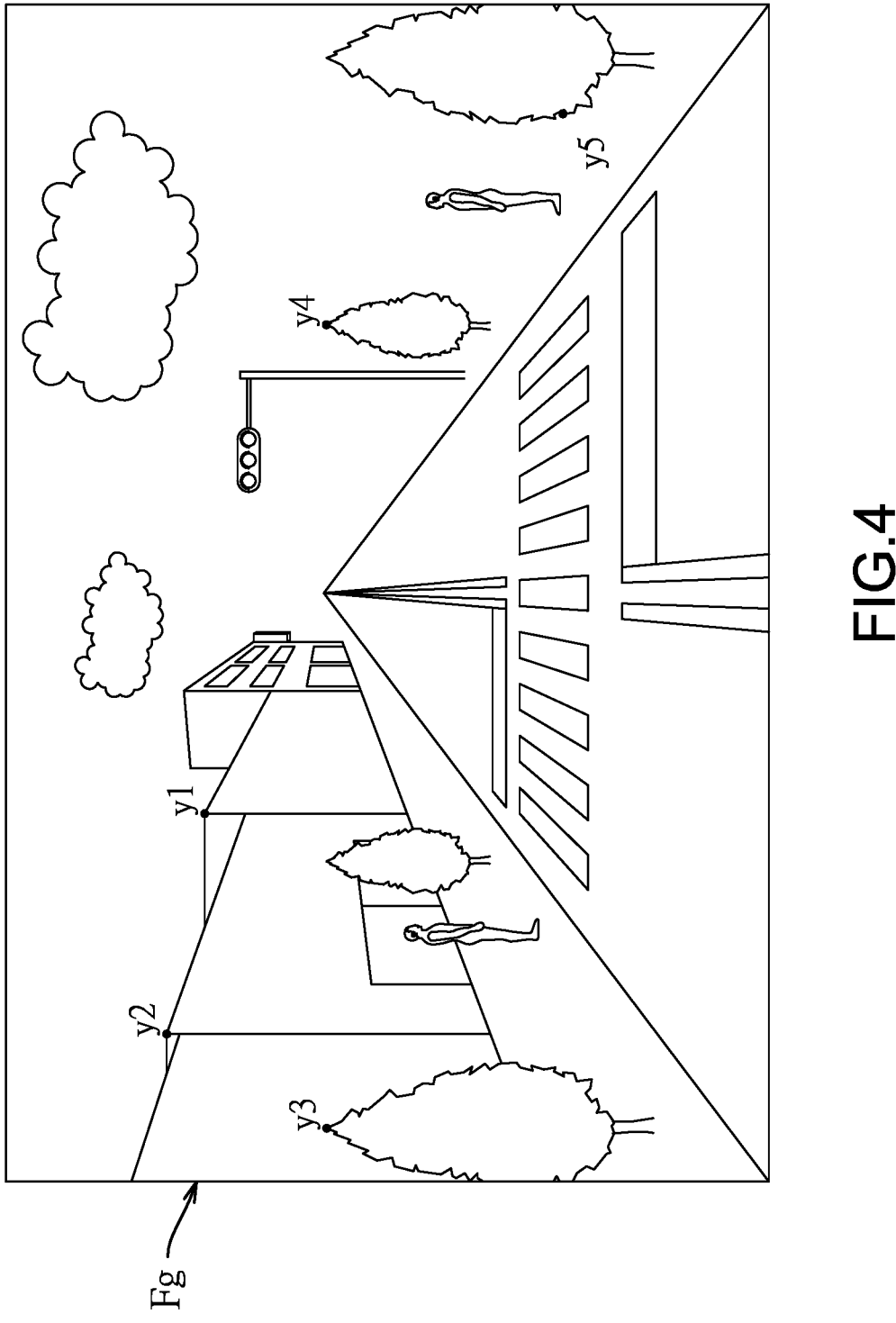
FIG. 4 is a schematic diagram of the processing device extracting multiple image features from an instant driving image in the present invention.

The processing device 50 performs an image pre-processing means and a feature extraction means on the instant driving image Fg received most recently from the camera 20 to extract and store multiple image features from the instant driving image Fg. Wherein the image pre-processing means and the feature extraction means are common knowledge in the art as described above, and will not be repeated. FIG. 4 shows the instant driving image Fg and multiple image features y1~y5 thereof.

Figure 5:
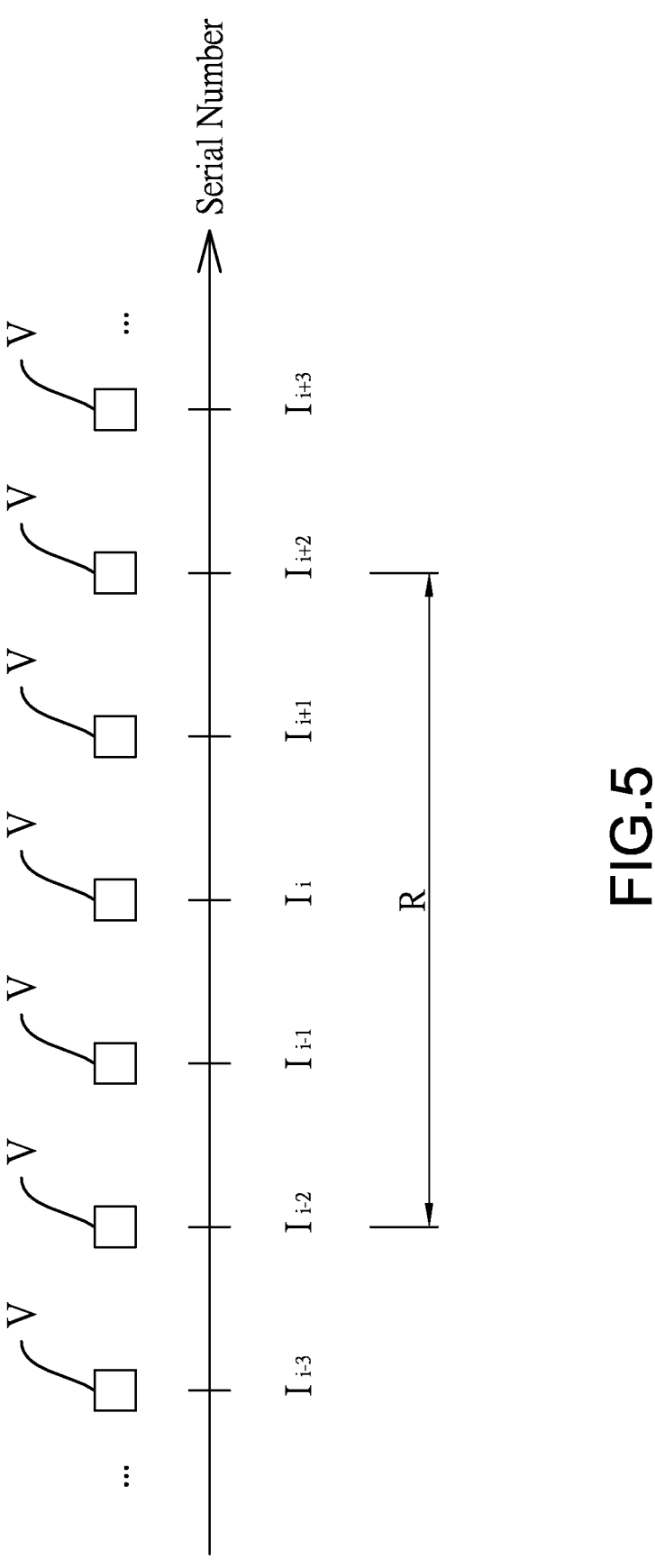
FIG. 5 is a schematic diagram of the processing device setting and storing a search start point and setting a search range based on the search start point in the present invention.

The processing device 50 then compares the multiple image features y1~y5 of the instant driving image Fg with the image features of at least two of the multiple pre-stored feature sets V to obtain a pre-stored feature set V that best matches the instant driving image Fg and obtain a pre-stored satellite locating coordinate Pv corresponding to the pre-stored feature set V. The comparing method is common knowledge in the art such as, Euclidean distance comparison means, but not limited thereto. For example, the multiple image features x1~x5 of the pre-stored driving image 123 shown in FIG. 2C and FIG. 3 best match the multiple image features y1~y5 extracted from the instant driving image Fg by the processing device 50 as shown in FIG. 4. That is to say, the image features extracted from FIG. 2A, FIG. 2B, FIG. 2D and FIG. 2E do not match the image features y1~y5 of the instant driving image Fg.

Wherein the processing device 50 is in an initial state, such as power on, the processing device 50 compares the multiple image features y1~y5 of the received first instant driving image Fg with all the pre-stored feature sets V in the storage device 10 to obtain the pre-stored feature set V that best matches the instant driving image Fg. Then, referring to FIG. 5, the processing device 50 may set and store a serial number $I_i$ of the best matching pre-stored feature set V as a search start point, and set a search range R based on the search start point. The search range R may be, for example, several serial numbers before and after the search start point. Referring to FIG. 5, the search range R includes the serial numbers $I_{i-2}$, $I_{i-1}$, $I_i$, $I_{i+1}$, and $I_{i+2}$. In this way, the processing device 50 may compare the image features of a second instant driving image Fg received afterwards with multiple pre-stored feature sets V in the search range R to obtain the latest pre-stored satellite locating coordinate Pv, and does not have to be compared with all pre-stored feature sets V in this storage device 10, thus accelerating the speed of search. In this way, as the vehicle moves, the processing device 50 receives different instant driving images Fg, so the processing device 50 constantly updates the search start point and the search range R according to the different instant driving images Fg. Then the latest pre-stored satellite locating coordinate Pv can be obtained.

On the other hand, the processing device 50 may also determine whether the vehicle is moving and calculate the offset of the vehicle to calibrate the location of the vehicle. Wherein the processing device 50 may track and compare the image features of the most recently stored frames of the instant driving images Fg to determine whether the vehicle is moving. For example, the serial numbers of five instant driving images being most recently stored are "099", "098", "097", "096" and "095" respectively. The processing device 50 sets the middle "097" instant driving image as the starting image, then tracks and compares the image features of the starting image with the two instant driving images "096" "095" and the two instant driving images "098" and "099" to determine whether the vehicle is moving. Furthermore, the processing device 50 may calculate the amount of change in the image features of two successively received instant driving images, and the amount of change is used as the offset of the vehicle, expressed as follows:

$$\text{offset} = \| f(Q_t) - f(Q_{t-1}) \|$$

Figure 6:
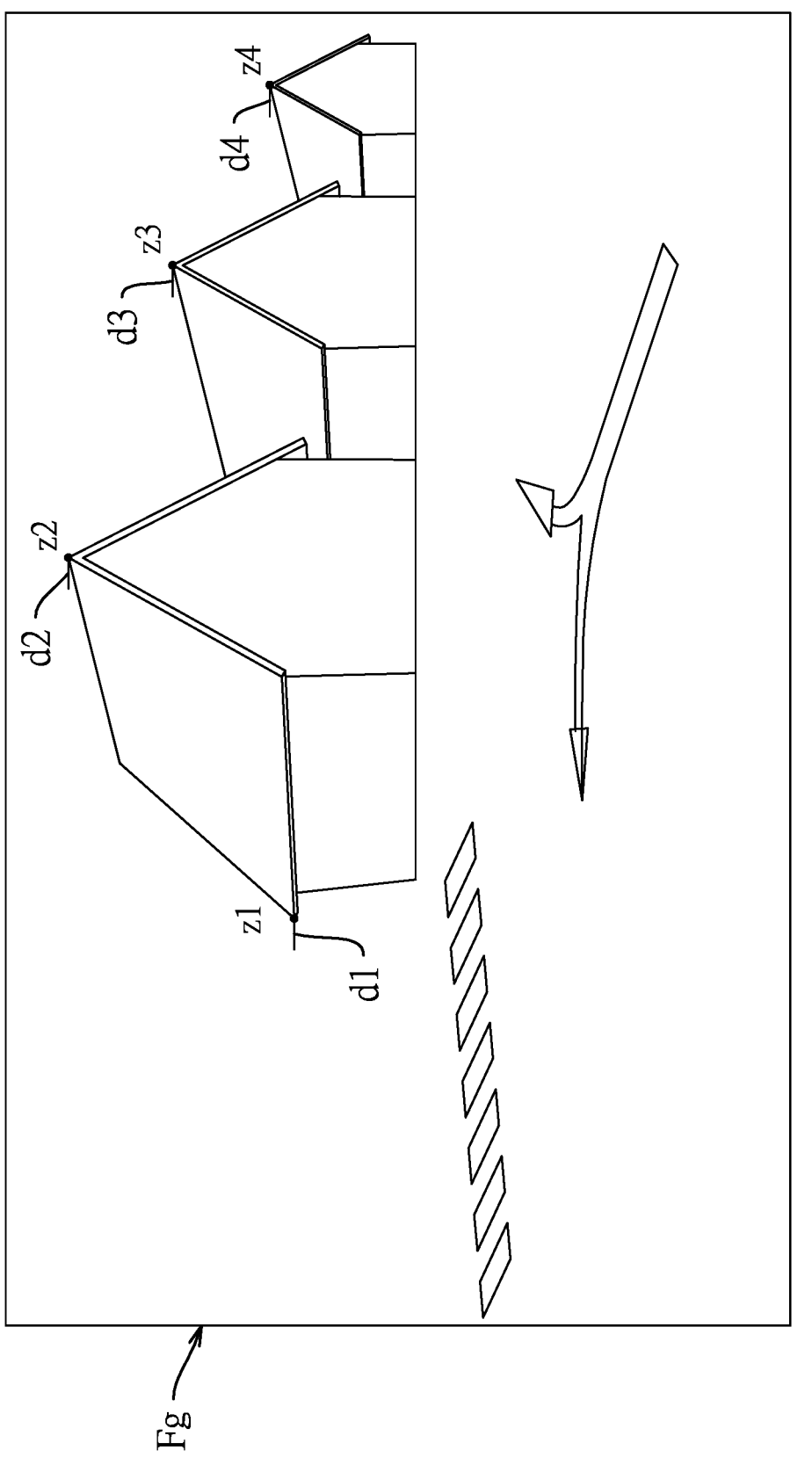
FIG. 6 is a schematic diagram of the processing device tracking the offset of the instantaneous driving image in the present invention.

Wherein, $f(Q_t)$ is the image feature of one instant driving image $Q_t$; $f(Q_{t-1})$ is the image feature of the previous instant driving image $Q_{t-1}$. Another example is shown in FIG. 6 of an instant driving image Fg and image features z1~z4 of the instant driving image Fg. The processing device 50 tracks the average of the displacement d1~d4 of at least one image feature z1~z4 compared to the previous instant driving image as the offset of the vehicle. It is noted that FIG. 6 shows four image features y1~y4 for illustration.

Figure 7:
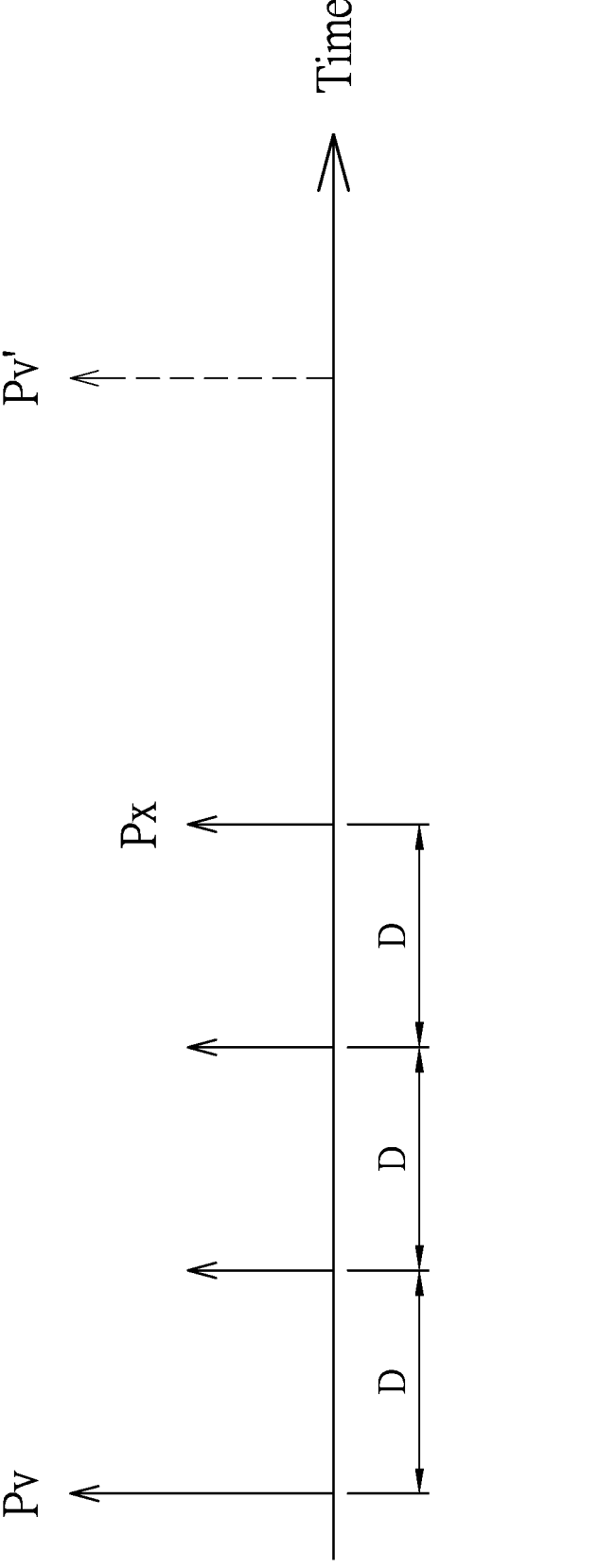
FIG. 7 is a schematic diagram of the processing device fusing a pre-stored satellite locating coordinates with an inertial measurement parameter to generate a transition coordinate in the present invention.

The processing device 50 fuses the pre-stored satellite locating coordinate Pv corresponding to the pre-stored feature set V that best matches the instant driving image Fg with the inertial measurement parameters IM to generate the first candidate coordinate P1. In general, the update frequency of the parameter of the inertial measurement device 30 is higher than the frequency of the processing device 50 to obtain the pre-stored satellite locating coordinate P. Referring to FIGS. 1 and 7, after obtaining the pre-stored satellite locating coordinate Pv and before obtaining the next pre-stored satellite locating coordinate Pv', the processing device 50 may obtain multiple inertial measurement parameters from the inertial measurement device 30 in sequence. The processing device 50 may fuse the pre-stored satellite locating coordinate Pv with these inertial measurement parameters to generate transition coordinates Px and store each transition coordinate Px. It is noted that it is common knowledge in the art to fuse the satellite coordinate Pv with the inertial measurement parameters. The invention is not limited to this example. The processing device 50 may perform two integration operations to obtain a displacement information D based on the acceleration information obtained from the inertial measurement device 30 each time, and the processing device 50 iterates these displacement information D on the pre-stored satellite locating coordinate Pv to generate the transition coordinate Px. In other words, the transition coordinate Px corresponds to the pre-stored satellite locating coordinate Pv after shifting these displacement information D.

The processing device 50 then generates the first candidate coordinate P1 based on the pre-stored satellite locating coordinate Pv, the transition coordinate Px and a fusion parameter $k_{pf}$ and stores each first candidate coordinate P1, expressed as follows:

$$P1=Pv+k_{pf}(Px-Pv)$$

In the above equation, the fusion parameter $k_{pf}$ can be expressed as follows:

$$k_{pf} = \sigma_v^2 / \left( \sigma_v^2 + \sigma_x^2 \right)$$

Wherein $\sigma_v$ is the standard deviation of the multiple pre-stored satellite locating coordinates Pv stored by the storage device 10, and $\sigma_x$ is the standard deviation of the stored transition coordinates Px.

2. Second Candidate Coordinate P2

The processing device 50 may store each satellite measurement coordinate $P_{gps}$ received from the satellite locating device 4. Referring to FIG. 1, the processing device 50 uses the latest satellite measurement coordinate $P_{gps}$ received from the satellite locating device 40 as the second candidate coordinate P2.

3. Estimated Reference Coordinate Pr

Figure 8:
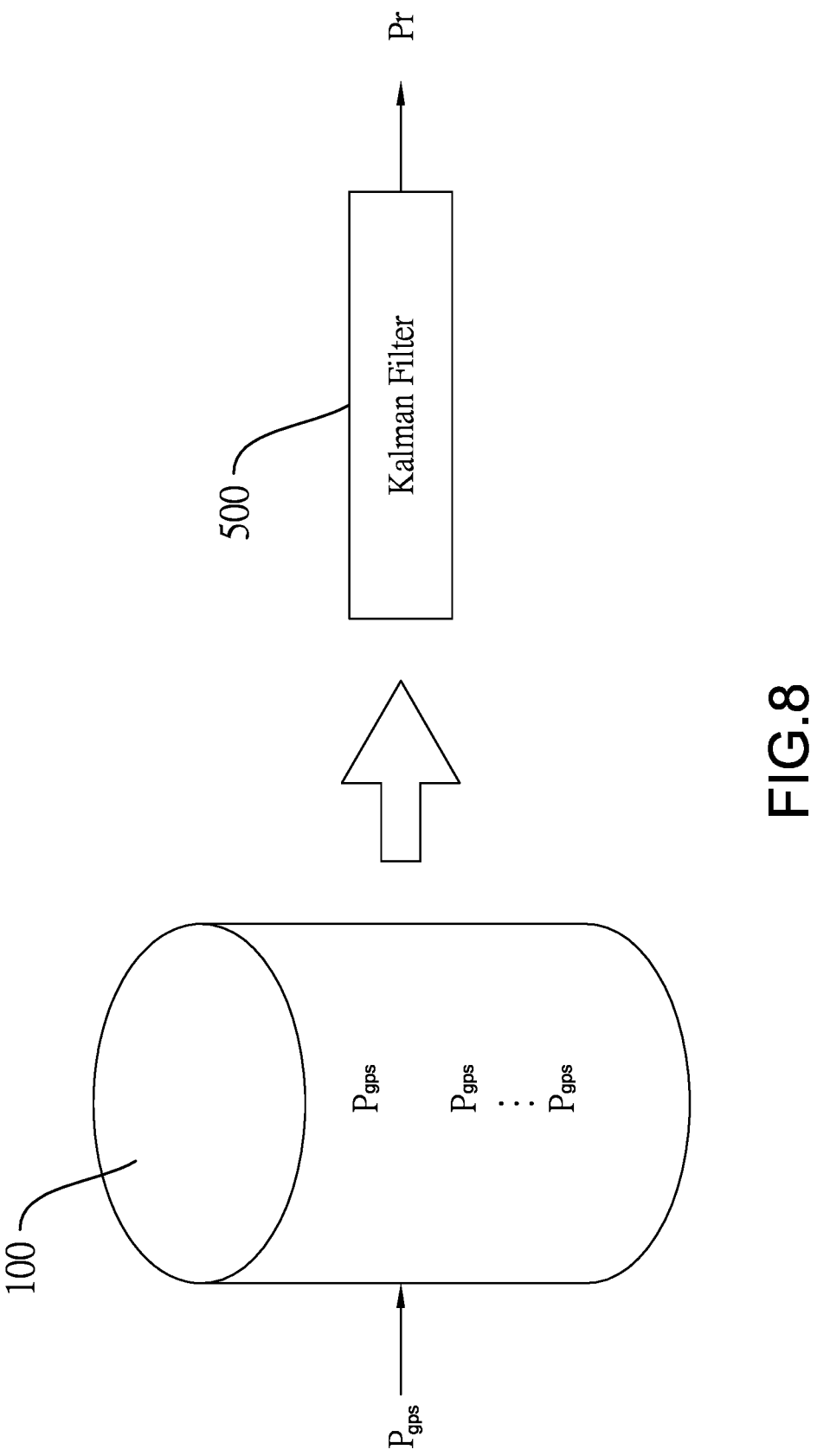
FIG. 8 is a schematic diagram of the processing device performing the Kalman filter output estimation reference coordinates in the present invention.

The processing device 50 generates an estimated reference coordinate Pr based on the received multiple satellite coordinates, as illustrated hereinafter by way of example but not limited thereto. Referring to FIGS. 1 and 8, the processing device 50 may store each satellite coordinate $P_{gps}$ received from the satellite locating device 40 in the storage device 10 as historical information 100. The historical information 100 may reflect the vehicle's trajectory. The processing device 50 may perform a Kalman filter 500 and input the historical information 100 of the satellite coordinates $P_{gps}$ to the Kalman filter 500, and the Kalman filter 500 may output the estimated reference coordinate Pr based on the historical information 100.

In another embodiment, the processing device 50 may generate the estimated reference coordinate Pr based on the first candidate coordinate P1, the latest received satellite measurement coordinate $P_{gps}$ and another fusion parameter $k_f$, expressed as follows:

$$Pr=P1+k_f(P_{gps}-P1)$$

In the above equation, the fusion parameter $k_f$ can be expressed as follows:

$$k_f = \sigma_1^2 / \left( \sigma_2^2 + \sigma_{gps}^2 \right)$$

Wherein, $\sigma_1$ is the standard deviation of the stored first candidate coordinates P1 and $\sigma_{gps}$ is the standard deviation of the stored satellite measurement coordinates $P_{gps}$.

4. Elected Coordinate P

After obtaining the first candidate coordinate P1, the second candidate coordinate P2 and the estimated reference coordinate Pr, the processing device 50 determines a difference between the first candidate coordinate P1 and the estimated reference coordinate Pr and a difference between the second candidate coordinate P2 and the estimated reference coordinate Pr, and selects the first candidate coordinate P1 or the second candidate coordinate P2 that has the smaller difference with the estimated reference coordinate Pr as the elected coordinate P, expressed as follows:

$$P=\min(\|P1-Pr\|,\|P2-Pr\|).$$

Wherein, $\|P1-Pr\|$ is the difference between the first candidate coordinate P1 and the estimated reference coordinate Pr (i.e., the distance between P1 and Pr); $\|P2-Pr\|$ is the difference between the second candidate coordinate P2 and the estimated reference coordinate Pr (i.e., the distance between P2 and Pr).

Figure 9:
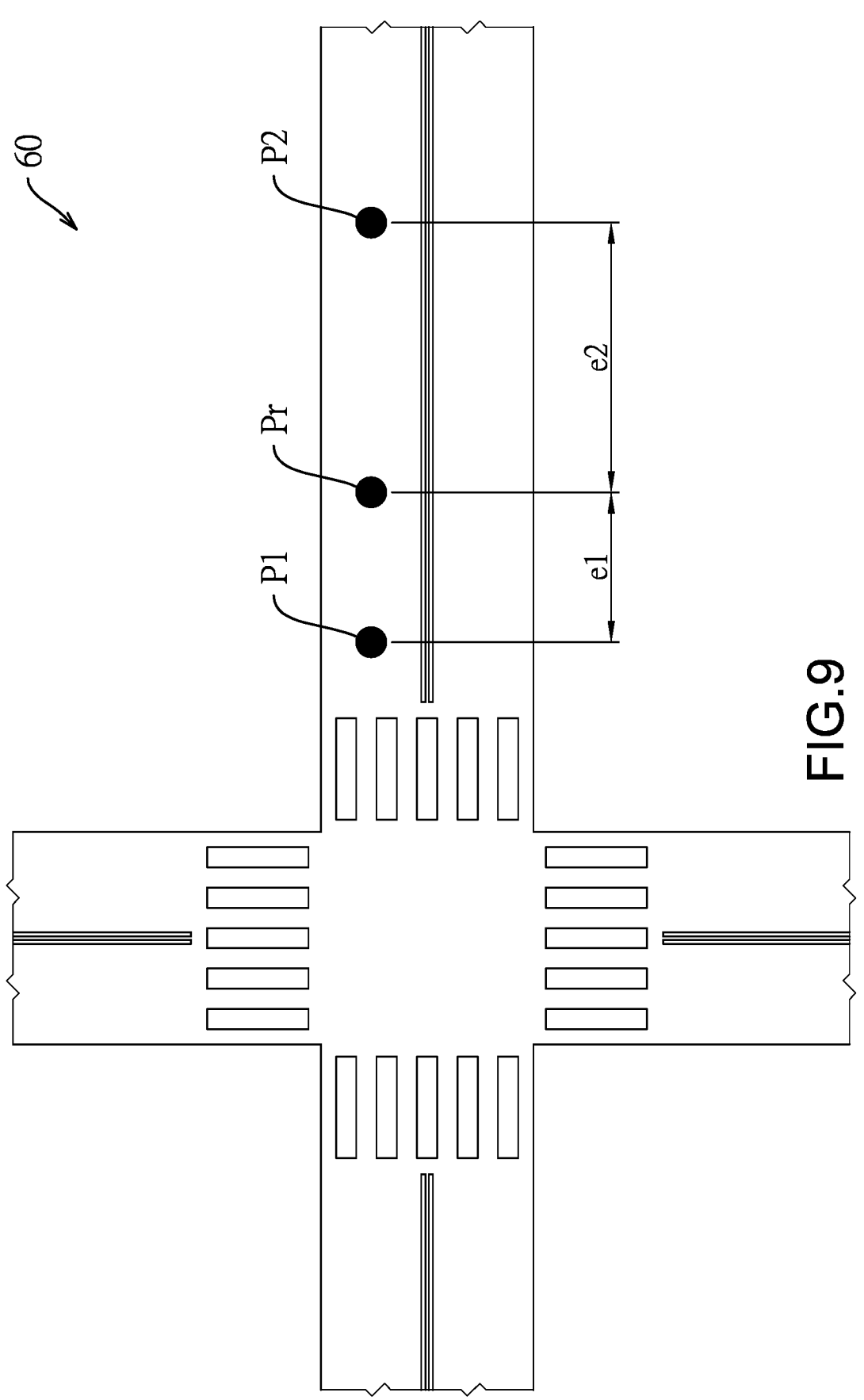
FIG. 9 is a schematic diagram of the processing device determining the difference between the first candidate coordinate and the second candidate coordinate and the estimated reference coordinate in the present invention.

Taking a map background 60 shown in FIG. 9 as an example, the processing device 50 calculates the difference between the first candidate coordinate P1 and the estimated reference coordinate Pr as e1, and the difference between this second candidate coordinate P2 and the estimated reference coordinate Pr as e2. The processing device 50 determines that e1<e2, and selects the first candidate coordinate P1 as the elected coordinate P.

Figure 10:
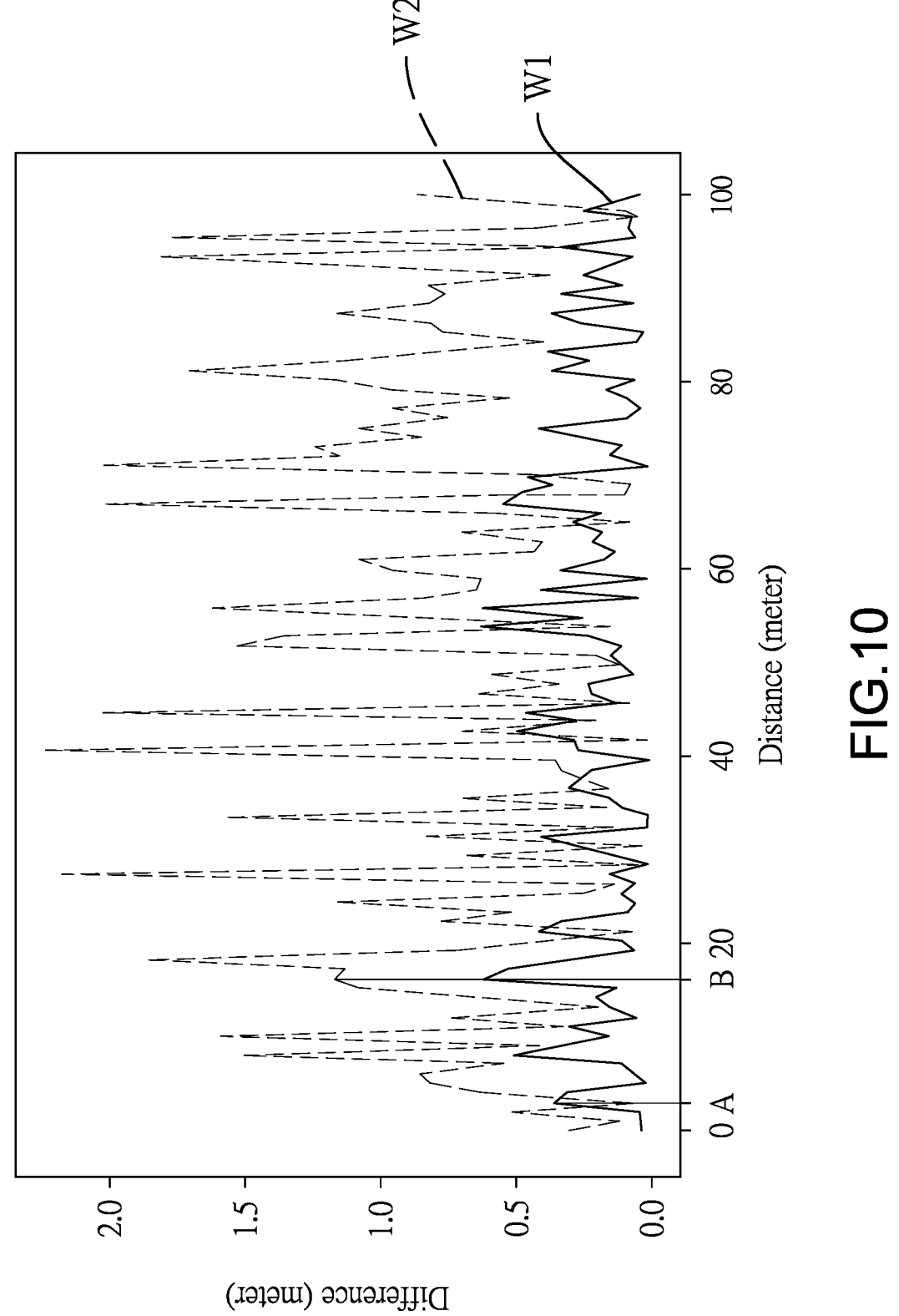
FIG. 10 is a waveform diagram of the difference between the first candidate coordinates and the second candidate coordinates and the estimated reference coordinates during vehicle moving in the present invention.

Taking a practical example, when the vehicle is moving, the processing device 50 records each of the first candidate coordinates P1, the second candidate coordinates P2 and the estimated reference coordinates Pr. Referring to FIG. 10, a first waveform W1 and a second waveform W2 are included. The first waveform W1 presents the differences between each of the first candidate coordinates P1 and each of the estimated reference coordinates Pr, and the second waveform W2 presents the differences between each of the second candidate coordinates P2 and each of the estimated reference coordinates Pr. For example, as shown in FIG. 10, the position of the second waveform W2 at the Ath meter is lower than the first waveform W1, which means that the difference between the second candidate coordinate P2 and the estimated reference coordinate Pr is lower, so that the second candidate coordinate P2 is the elected coordinate P at the Ath meter. And the position of the first waveform W1 at the Bth meter is lower than this second waveform W2, so that the first candidate coordinate P1 is the elected coordinate at the Bth meter. The elected coordinate P of other positions may be followed in same way. In other words, the elected coordinate P is selected from one of the first candidate coordinate P1 and the second candidate coordinate P2 while the vehicle is moving.

Figure 11:
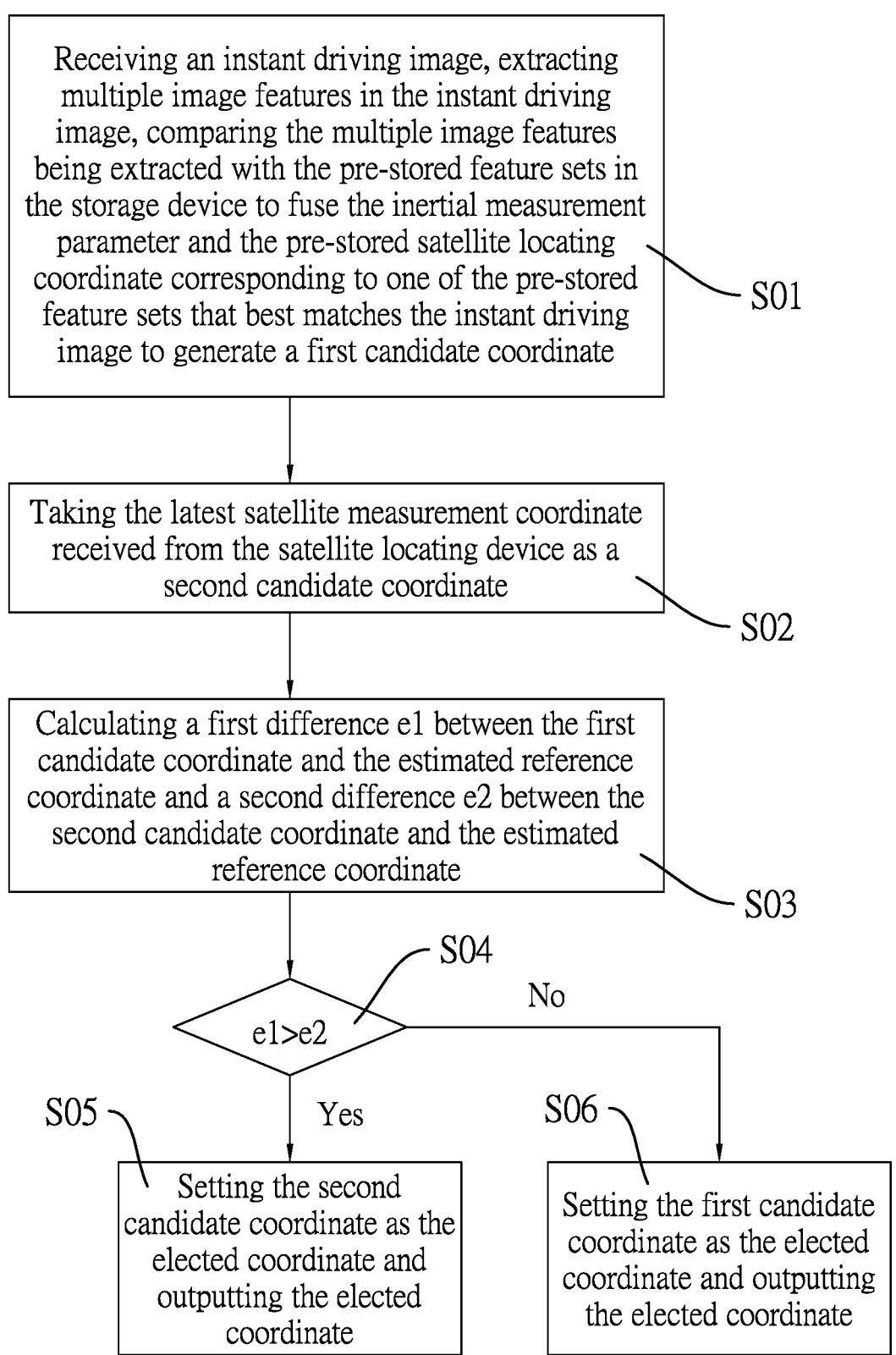
FIG. 11 is a flow chart of the computer vision vehicle locating fusion method of the present invention.

In summary, referring to FIG. 11, the computer vision vehicle location fusion method of the present invention comprises the following steps.

S01: generating a first candidate coordinate P1. The processing device 50 receives an instant driving image Fg, extracts multiple image features in the instant driving image Fg, compares the multiple image features being extracted with the pre-stored feature sets Vs in the storage device 10 to fuse the inertial measurement parameter IM and the pre-stored satellite locating coordinate corresponding to one of the pre-stored feature sets V that best matches the instant driving image Fg to generate a first candidate coordinate P1.

S02: generating a second candidate coordinate P2. The processing device 50 uses the latest satellite measurement coordinate $P_{gps}$ received from the satellite locating device 40 as the second candidate coordinate P2.

S03: calculating a first difference e1 between the first candidate coordinate P1 and the estimated reference coordinate Pr and a second difference e2 between the second candidate coordinate P2 and the estimated reference coordinate Pr by the processing device 50.

S04: determining whether the first difference e1 is greater than the second difference e2 by the processing device 50, that is, determining whether the first candidate coordinate P1 or the second candidate coordinate P2 has the smaller difference with the estimated reference coordinate Pr. If e1 is greater than e2, it means that the second difference between the second candidate coordinate P2 and the estimated reference coordinate Pr is smaller, and then step S05 is preformed; if e1 is less than e2, it means that the difference between the first candidate coordinate P1 and the estimated reference coordinate Pr is smaller, and then step S06 is performed.

S05: since the second difference e2 between the second candidate coordinate P2 and the estimated reference coordinate Pr is smaller, setting the second candidate coordinate P2 as the elected coordinate P and outputting the elected coordinate P by the processing device 50.

S06: since the first difference e1 between the first candidate coordinate P1 and the estimated reference coordinate Pr is smaller, setting the first candidate coordinate P1 as the elected coordinate P and outputting the elected coordinate P by the processing device 50.

In summary, the present invention senses the surrounding environment of the vehicle based on the instant driving images Fg taken by the camera 20 through the cooperative operation of the camera 20, the satellite locating device 40, the inertial measurement device 30, the storage device 10 and the processing device 50, obtains the pre-stored satellite locating coordinate Pv for initial positioning, and then cooperates with the satellite locating device 40 and the inertial measurement device 30 for positioning fusion. Therefore, the computer vision locating fusion architecture is realized to generate the first candidate coordinate P1 and the second candidate coordinate P2. The first candidate coordinate P1 or the second candidate coordinate P2 that has the smaller difference with the estimated reference coordinate Pr is the better positioning coordinate, so that the better positioning coordinate is selected from the first candidate coordinate and the second candidate coordinate while the vehicle is moving.

For example, when the vehicle's surrounding environment has a greater interference with the satellite locating device 40, the difference e2 between the second candidate coordinate P2 and the estimated reference coordinate Pr is greater than the difference e2 between the first candidate coordinate P1 and the estimated reference coordinate Pr. At this time, the present invention uses the first candidate coordinate P1 as the elected coordinate P instead of the second candidate coordinate P2 with greater interference, thereby achieving a relative reduction in the impact of environmental changes on the locating technology of the invention and effectively improving the locating reliability of the invention.

What is claimed is:

1. A computer vision vehicle locating fusion system comprising:

a storage device storing multiple pre-stored feature sets and multiple pre-stored satellite locating coordinates respectively corresponding to the multiple pre-stored feature sets, wherein each of the pre-stored feature sets comprises multiple image features, and the multiple image features of each one of the multiple pre-stored feature sets are non-identical to the multiple image features of the other pre-stored feature sets;

a camera configured to be provided in a vehicle to output an instant driving image;

a satellite locating device configured to be provided in the vehicle to receive a satellite measurement coordinate of the vehicle;

an inertial measurement device configured to be provided in the vehicle to output an inertial measurement parameter of the vehicle; and a processing device configured to be provided in the vehicle and connect the storage device, the camera, the inertial measurement device and the satellite locating device; wherein, an update frequency of the inertial measurement parameter of the inertial measurement device is higher than a frequency of the processing device to obtain the pre-stored satellite locating coordinates, such that after obtaining one of the pre-stored satellite locating coordinates and before obtaining a next one of pre-stored satellite locating coordinates, the processing device obtains multiple inertial measurement parameters from the inertial measurement device in sequence;

the processing device extracts multiple image features from the instant driving image by image graying, filtering, edge detection, and convolutional neural network (CNN), compares the multiple image features extracted with the pre-stored feature sets in the storage device by Euclidean distance comparison to fuse the inertial measurement parameter and the pre-stored satellite locating coordinate corresponding to one of the pre-stored feature sets that best matches the instant driving image to generate a first candidate coordinate; the processing device uses the satellite measurement coordinate as a second candidate coordinate; and the processing device calculates a first difference of distance between the first candidate coordinate and an estimated reference coordinate and a second difference of distance between the second candidate coordinate and the estimated reference coordinate, to determine and output the first candidate coordinate or the second candidate coordinate that has a smaller difference of distance with the estimated reference coordinate for positioning the vehicle.

2. The computer vision vehicle locating fusion system as claimed in claim 1, wherein the processing device sets and stores a serial number of the one of the pre-stored feature sets that best matches the instant driving image as a search start point and sets a search range based on the search start point.

3. The computer vision vehicle locating fusion system as claimed in claim 1, wherein, the processing device fuses the pre-stored satellite locating coordinate Pv with the inertial measurement parameter to generate a transition coordinate Px, and generates the first candidate coordinate P1 based on the pre-stored satellite locating coordinate Pv, the transition coordinate Px and a fusion parameter $k_{pf}$, wherein, P1=Pv+$k_{pf}$(Px−Pv).

4. The computer vision vehicle locating fusion system as claimed in claim 1, wherein the processing device performs a Kalman filter to generate the estimated reference coordinate.

5. The computer vision vehicle locating fusion system as claimed in claim 1, wherein the processing device generates the estimated reference coordinate Pr based on the first candidate coordinate P1, the satellite measurement coordinate $P_{gps}$ and a fusion parameter $k_f$, wherein, Pr=P1+$k_f$($P_{gps}$−P1).

6. The computer vision vehicle locating fusion system as claimed in claim 1, wherein, the multiple pre-stored feature sets are stored in a feature database of the storage device, and the feature database stores serial numbers respectively corresponding to the multiple pre-stored feature sets.

7. The computer vision vehicle locating fusion system as claimed in claim 6, wherein an image database of the storage device stores multiple pre-stored driving images, and the serial numbers represent shooting time sequences of the multiple pre-stored driving images.

8. The computer vision vehicle locating fusion system as claimed in claim 1, wherein the inertial measurement parameter includes an angular velocity information and an acceleration information.

9. The computer vision vehicle locating fusion system as claimed in claim 1, wherein the processing device determines the first candidate coordinate or the second candidate coordinate that has the smaller difference of distance with the estimated reference coordinate as an elected coordinate, and outputs the elected coordinate expressed as follows:

$$P=\min(\|P1-Pr\|, \|P2-Pr\|)$$

wherein, P is the elected coordinate; P1 is the first candidate coordinate; P2 is the second candidate coordinate; Pr is the estimated reference coordinate; $\|P1-Pr\|$ is a distance between the first candidate coordinate and the estimated reference coordinate; and $\|P2-Pr\|$ is a distance between the second candidate coordinate and the estimated reference coordinate.

10. A computer vision vehicle locating fusion method, performed by a processing device, comprising:

receiving an instant driving image from a camera, extracting multiple image features in an instant driving image by image graying, filtering, edge detection, and convolutional neural network (CNN), and comparing the multiple image features being extracted with pre-stored feature sets in a storage device by Euclidean distance comparison to fuse an inertial measurement parameter and a pre-stored satellite locating coordinate corresponding to one of the pre-stored feature sets that best matches the instant driving image to generate a first candidate coordinate;

using one satellite measurement coordinate received from a satellite locating device as a second candidate coordinate;

calculating a first difference of distance between the first candidate coordinate and an estimated reference coordinate, and calculating a second difference of distance between the second candidate coordinate and the estimated reference coordinate; and determining and outputting the first candidate coordinate or the second candidate coordinate that has a smaller difference of distance with the estimated reference coordinate for positioning the vehicle;

wherein an update frequency of the inertial measurement parameter of an inertial measurement device connected to the processing device is higher than a frequency of the processing device to obtain the pre-stored satellite locating coordinate, such that after obtaining the pre-stored satellite locating coordinate and before obtaining a next pre-stored satellite locating coordinate, the processing device obtains multiple inertial measurement parameters from the inertial measurement device in sequence.

11. The computer vision vehicle locating fusion method as claimed in claim 10, wherein, the processing device sets and stores a serial number of the one of the pre-stored feature sets that best matches the instant driving image as a search start point and sets a search range based on the search start point.

12. The computer vision vehicle locating fusion method as claimed in claim 10, wherein, the processing device fuses the pre-stored satellite locating coordinate Pv with the inertial measurement parameter to generate a transition coordinate Px, and generates the first candidate coordinate P1 based on the pre-stored satellite locating coordinate Pv, the transition coordinate Px and a fusion parameter kpf, wherein, $P1=Pv+k_{pf}(Px-Pv)$.

13. The computer vision vehicle locating fusion method as claimed in claim 10, wherein, the processing device performs a Kalman filter to generate the estimated reference coordinate.

14. The computer vision vehicle locating fusion method as claimed in claim 10, wherein, the processing device generates the estimated reference coordinate Pr based on the first candidate coordinate P1, the satellite measurement coordinate $P_{gps}$ and a fusion parameter kf, wherein, $Pr=P1+k_f(P_{gps}-P1)$.

15. The computer vision vehicle locating fusion method as claimed in claim 10, wherein, the inertial measurement parameter includes an angular velocity information and an acceleration information.

16. The computer vision vehicle locating fusion method as claimed in claim 10, wherein, the processing device determines the first candidate coordinate or the second candidate coordinate that has the smaller difference of distance with the estimated reference coordinate as an elected coordinate, and outputs the elected coordinate, expressed as follows:

$$P=\min(\|P1-Pr\|, \|P2-Pr\|)$$

wherein, P is the elected coordinate; P1 is the first candidate coordinate; P2 is the second candidate coordinate; Pr is the estimated reference coordinate; $\|P1-Pr\|$ is a distance between the first candidate coordinate and the estimated reference coordinate; and $\|P2-Pr\|$ is a distance between the second candidate coordinate and the estimated reference coordinate.

* * * * *